United States Patent
Fondeur et al.

(10) Patent No.: US 9,519,824 B2
(45) Date of Patent: Dec. 13, 2016

(54) METHOD FOR ENABLING AUTHENTICATION OR IDENTIFICATION, AND RELATED VERIFICATION SYSTEM

(75) Inventors: Jean-Christophe Fondeur, Issy les Moulineaux (FR); Hervé Chabanne, Issy les Moulineaux (FR)

(73) Assignee: MORPHO, Issy-les-Moulineaux (FR)

( * ) Notice: Subject to any disclaimer, the term of this patent is extended or adjusted under 35 U.S.C. 154(b) by 0 days.

(21) Appl. No.: 13/997,151

(22) PCT Filed: Nov. 29, 2011

(86) PCT No.: PCT/FR2011/052816
§ 371 (c)(1),
(2), (4) Date: Jun. 21, 2013

(87) PCT Pub. No.: WO2012/085378
PCT Pub. Date: Jun. 28, 2012

(65) Prior Publication Data
US 2013/0279765 A1  Oct. 24, 2013

(30) Foreign Application Priority Data
Dec. 23, 2010 (FR) ...................................... 10 61160

(51) Int. Cl.
*G06K 9/00* (2006.01)
*G06F 21/31* (2013.01)
*G07C 9/00* (2006.01)

(52) U.S. Cl.
CPC ........... *G06K 9/00208* (2013.01); *G06F 21/31* (2013.01); *G07C 9/00142* (2013.01)

(58) Field of Classification Search
None
See application file for complete search history.

(56) References Cited

U.S. PATENT DOCUMENTS 5,559,961 A * 9/1996 Blonder ............. G07C 9/00142
 726/18
5,991,429 A * 11/1999 Coffin ................ G06K 9/00255
 382/118

(Continued)

FOREIGN PATENT DOCUMENTS

WO  WO-0177792 A2  10/2001
WO  WO-0237429 A1  5/2002

OTHER PUBLICATIONS

Hadid, A. Heikkila, J.Y., Silven O, Pietikainen, M. "Face and Eye Detection for Person Authentication in Mobile Phones" First ACM/IEEE International Conference on Distrubuted Smart Cameras. 2007.*

(Continued)

*Primary Examiner* — Kim Vu
*Assistant Examiner* — Molly Delaney
(74) *Attorney, Agent, or Firm* — Marshall, Gerstein & Borun LLP

(57) ABSTRACT

The invention relates to a method for enabling the authentication or identification of a person (1) using a first electronic device (2) comprising an image-capturing unit and a data-transmission unit, the method including a step of registering said person in a verification system (3). The registration step includes the steps of: capturing, using the image-capturing unit of said electronic device, a first image (h) of at least one object (O) of any kind that is secretly selected by the person; and transmitting said first image to the verification system by means of said data transmission device of said first electronic device.

9 Claims, 2 Drawing Sheets

(56) References Cited

U.S. PATENT DOCUMENTS

| | | | | |
|---|---|---|---|---|
| 6,819,219 | B1* | 11/2004 | Bolle | G06F 21/32 340/5.52 |
| 7,308,581 | B1* | 12/2007 | Geosimonian | G06F 21/32 713/182 |
| 7,861,089 | B2* | 12/2010 | Tomita | 713/182 |
| 8,238,880 | B2* | 8/2012 | Jin | H04W 12/06 340/5.83 |
| 8,316,096 | B2* | 11/2012 | Svendsen | H04L 51/10 382/118 |
| 8,406,480 | B2* | 3/2013 | Grigsby | G06K 9/00 340/5.21 |
| 8,583,630 | B2* | 11/2013 | Schultz | G06F 17/3089 707/705 |
| 8,625,847 | B2* | 1/2014 | Pasquero | G06F 3/013 382/103 |
| 2005/0229008 | A1* | 10/2005 | Crane | G06F 21/32 713/186 |
| 2006/0122939 | A1* | 6/2006 | Cohen | G06F 21/121 705/59 |
| 2006/0206918 | A1* | 9/2006 | McLean | G06F 21/36 726/2 |
| 2006/0248341 | A1* | 11/2006 | Lambert | G06F 21/32 713/182 |
| 2007/0016777 | A1* | 1/2007 | Henderson | H04L 63/0861 713/169 |
| 2007/0198286 | A1* | 8/2007 | Tomita | G06F 21/32 713/182 |
| 2009/0210939 | A1* | 8/2009 | Xu | G06K 9/00154 726/19 |
| 2011/0138175 | A1* | 6/2011 | Clark | H04L 51/12 713/168 |
| 2011/0249144 | A1* | 10/2011 | Chang | G06F 17/30259 348/231.3 |
| 2011/0258130 | A1* | 10/2011 | Grabiner | G06Q 10/087 705/317 |
| 2012/0019379 | A1* | 1/2012 | Ben Ayed | G08B 13/1436 340/539.1 |
| 2012/0072996 | A1* | 3/2012 | Svendsen | H04L 51/28 726/28 |
| 2014/0162598 | A1* | 6/2014 | Villa-Real | H04M 1/66 455/411 |

OTHER PUBLICATIONS

English translation of International Search Report for International application No. PCT/FR2011/052816, mailed Mar. 28, 2012.

Xiaoyuan et al.., "*Graphical Passwords: A Survey*," Proceedings of the 21st Annual Computer Security Applications Conference (ACSAC 2005), pp. 463-472.

* cited by examiner

METHOD FOR ENABLING AUTHENTICATION OR IDENTIFICATION, AND RELATED VERIFICATION SYSTEM

FIELD OF THE INVENTION

The present invention relates to the authentication or identification (in other words a verification) of a person, with the aid of an electronic device.

BACKGROUND OF THE INVENTION

In this document, one will note that when "authentication or identification" is mentioned, the "or" is inclusive, meaning "and/or"; the invention therefore applies to authentication as well as to identification, or even to both at the same time.

Authentication or identification conventionally use a server which stores data concerning persons who have previously been the object of a phase of registration (or enrollment) with said server in order to be granted some right after the authentication or verification (issuing a driver's license, a public transit ticket, monetary compensation, authorization to access a room, authorization to access a service, use of a service, electronic payment, etc.).

The data conventionally used for registering individuals with the server are personal data that are usually alphanumeric, such as passwords, addresses of electronic devices used by the individuals (e.g. IP addresses), identities, and/or other data.

To be sufficiently differentiating and thus allow authentication or identification with an acceptable success rate, the data used may be relatively complex from the individual's point of view. For example, the more characters a password contains, the more reliable the authentication or identification, but the more difficult it is for a person to remember.

SUMMARY OF THE INVENTION

To ease this burden, it has been proposed to base the registration and authentication or identification on other types of data, such as predetermined images, to replace or supplement the data conventionally used.

During registration, an individual is asked to choose a small number of images from among a finite set of predetermined images. For example, the person can choose a theme from a list (types of animals, types of hobbies, etc.) then select an image related to the chosen theme from among several dozen or several hundred proposed images. Then the authentication or identification for this person can consist of reproducing the same approach and thus reselecting the same image, so that this image can be compared to the image selected during registration.

If the two images are identical, it can be deduced, possibly with an additional comparison between other types of data, that the person concerned corresponds to an enrolled person (an identification) or to the enrolled person he claims to be (an authentication).

Although this eliminates an individual having to remember overly complex data, this process still requires non-trivial effort, as the person has to select the images and remember his selection between the registration and each authentication or identification.

In addition, as the set of predetermined images proposed to each person is necessarily of limited size, the probability that two people will choose the same images can remain high, thus limiting the reliability of the authentication or identification.

One aim of the invention is to further ease the burden on registered persons and, where necessary, to improve the performance of the authentication or identification.

The invention thus proposes a method enabling the authentication or identification of a person, using a first electronic device comprising an image-capturing unit and a data transmission unit, said method including a phase of registering said person with a verification system (i.e. authentication or identification). The registration phase comprises the following steps:

capturing, using the image-capturing unit of said first electronic device, a first image of at least one object of any kind that is secretly selected by the person;
 transmitting said first image to the verification system by means of the data transmission unit of said first electronic device.

In this manner, the complexity is transferred from the person to the verification system. In effect, as the obtained image is entirely up to the person, who is free to choose any object or part of an object to be photographed, a remarkable level of customization is obtained, which reduces the effort required for said person to remember it. Conversely, the image comparison algorithm used by the verification system for the authentication or identification can be relatively complex compared to more conventional data comparison algorithms (such as comparing two passwords or two images known in advance).

In addition, as the image is obtained by the person from among a potentially infinite set that is not determined in advance, the risk of having two persons capture the same image or very similar images is reduced, which can improve the performance of the authentication or identification compared to the prior art discussed above and/or reduce the need for other types of complex data to supplement the images.

In some advantageous embodiments, which may be combined in any conceivable manner:

the object chosen by the person is an object that the person always has on him or within reach. The task of the person is then further simplified, because his authentication or identification can be done with very little effort, and possibly at any time and/or anywhere;
 the first image is sent to the verification system in a secure manner. This prevents an attacker from being able to capture it during transmission. Whether or not it is secure, the transmission of the first image to the verification system may be direct or may pass through one or more intermediate devices.
 at least a first personal data item for said person is sent to the verification system as a supplement to the first image. This enriches the types of data that will permit the authentication or identification.
 the method further includes an authentication or identification phase relative to said person, using a second electronic device, the authentication or identification phase comprising the following steps carried out in the verification system:
 receiving from the second electronic device a second image of at least one object that is identical or similar to the object in the first image;
 comparing the second image to at least the first image;
 concluding that the person is authenticated or identified successfully when the comparison of the second image to the first image reveals a match between their respective objects.

the method further comprises the receiving, from the second electronic device, of a second personal data item for said person corresponding to the first personal data item, and the comparison of the second personal data item to at least the first personal data item, and wherein it is concluded that the person is authenticated or identified successfully when the comparison of the second image to the first image reveals a match between their respective objects and the comparison of the second personal data item to the first personal data item reveals a match between the second personal data item and the first personal data item.

the second image has been freshly captured using an image-capturing unit of said second electronic device, for the purposes of the authentication or identification of the person in said verification system. This eliminates the storage and reuse of the first image, which would be less secure.

the first electronic device and the second electronic device are the same device.

the first electronic device and/or the second electronic device belong to said person. This again simplifies the task of the person. It may, for example, involve a mobile phone or some other device commonly carried or easily accessed by the person.

the second image is sent in a secure manner from the second electronic device to the verification system. This prevents an attacker from capturing it during transmission. Whether or not it is secure, the transmission of the second image to the verification system may be direct or may pass through one or more intermediate devices.

The invention additionally proposes a verification system enabling the authentication or identification of a person according to the above method. The verification system comprises:

a first receiving unit for receiving, from a first electronic device, a first captured image of at least one object of any kind that is secretly selected by the person;

a second receiving unit (which is possibly the same as the first receiving unit) for receiving, from a second electronic device, a second image of at least one object that is identical or similar to the object of the first image;

an image comparison unit that compares the second image to at least the first image;

a decision unit which decides that the person is authenticated or identified successfully when the comparison of the second image to the first image performed by the image comparison unit reveals a match between their respective objects.

The verification system may consist of a single device (e.g. a server), or it may be distributed across multiple entities. As a non-limiting example, the receiving units and the image comparison unit could be part of a first entity, for example an entity co-located or located near the electronic device, while the decision unit could call upon a second entity that is different from the first one, for example a centralized server.

The invention also proposes a computer program product comprising code instructions for implementing said method when it is loaded onto and executed by computer means, for example the first electronic device and/or the second electronic device and/or the verification system.

BRIEF DESCRIPTION OF THE DRAWINGS

Other features and advantages of the invention will become apparent from the following description of some non-limiting examples, with reference to the accompanying drawings, in which.

DETAILED DESCRIPTION

A first aspect of the invention consists of a phase of registering (or enrolling) a person with a verification system, in preparation for a future authentication or identification of said person. As indicated above, the aim of this registration phase is to allow the person to be granted a right at a later time (issuing a driver's license, a public transit ticket, a monetary compensation, authorization to access a room, authorization to access a service, use of a service, e-payment, etc.).

Figure 1:
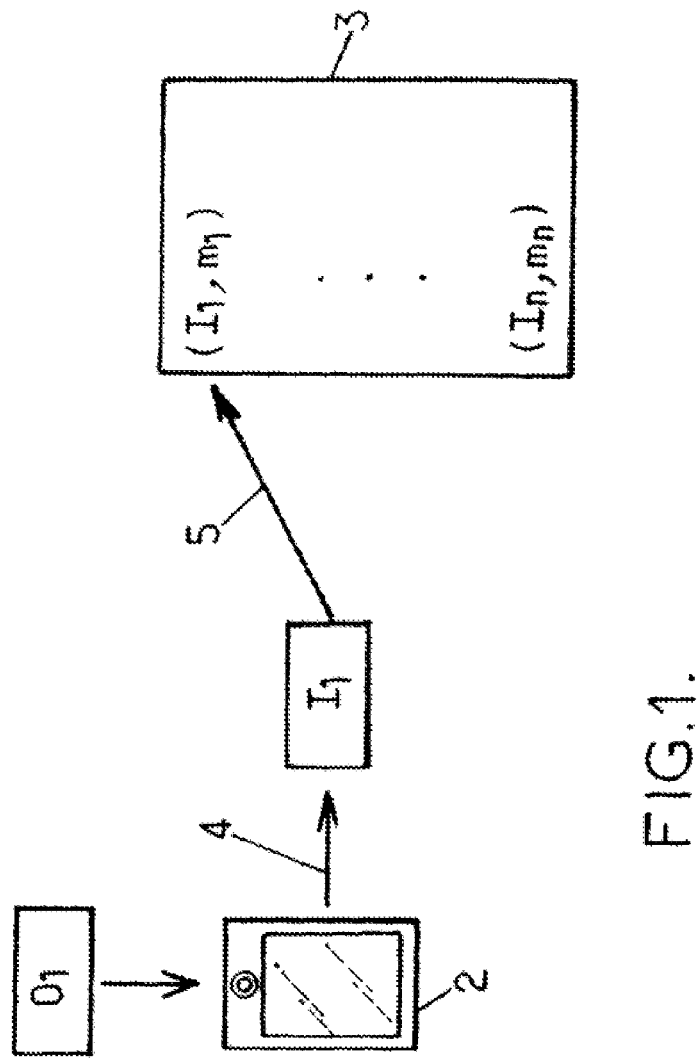
FIG. 1 is a diagram showing an example of a registration phase which can be used in an embodiment of the invention.

This aspect is illustrated in the non-limiting example illustrated in FIG. 1, in which the person 1 is registered with a verification system 3, which may be of any conceivable type. As a non-limiting example, it can be a server in any form (computer with local storage, complex computer system cooperating with remote storage, etc.). In another non-limiting example, the verification system may be a system distributed across multiple entities, each one handling one or more functions. For simplicity, the rest of the description will specifically discuss the case where the verification system 3 consists of a single server (referred to as the server 3).

The registration is done using an electronic device 2 which comprises an image-capturing unit and a data transmission unit. This electronic device may be of any conceivable type. It may, for example, be a mobile device such as a mobile phone, a smart phone, a personal digital assistant (PDA), a laptop computer, an e-tablet, or some other device, equipped with an image and/or video capturing module and having means for transmitting data using any appropriate technology (transmission using a cellular communications standard such as GPRS, EDGE, UMTS, LTE or other, transmission using a wireless technology such as WiFi, WiMax, Bluetooth, etc.).

Additionally or alternatively, it may for example be a fixed device such as a computer, equipped with a webcam and with means for transmitting data using a protocol such as IP or some other protocol.

Additionally or alternatively, it may be a complex device involving multiple dissociable entities, such as a camera or camcorder for capturing the image and a separate entity such as a computer or other entity for the data transmission. In this case, the various entities constituting the device must be able to cooperate so that an image captured by one entity can then be transmitted in an appropriate manner by the other entity.

Advantageously, the electronic device 2 is utilized by the person 1 for his own use, or even belongs to him, meaning it is the property of the person 1. It is particularly advantageous if the person 1 is routinely equipped with the electronic device 2, as is the case for example with a mobile phone, so that the person 1 can use it at any time or at almost any time. It is possible, however, for the electronic device 2 not to be the property of the person 1, but to be used by several or even by all persons who are the object of a registration phase. It may therefore involve a device directly associated with the server 3.

In order to register a person 1, an image $I_1$ is captured using the image-capturing unit of the electronic device 2 (step 4). This image $I_1$ represents one or more objects $O_1$ of any kind that are selected secretly by the person 1. In this context, the term "object" is to be interpreted in its broadest sense. The image $I_1$ may thus be of at least one physical object. In a particularly advantageous example, the object $O_1$ represented in the image $I_1$ may be a characteristic item that the person 1 always or often has on him or within reach, such as a favorite keychain, a piece of jewelry, a photograph, a tattoo, a scar, or some other item.

Additionally or alternatively, the object $O_1$ may involve something other than a physical object, for example a characteristic scene such as a sunset, etc.

One will note that the concept of an image is also to be interpreted broadly. As an example, the captured image $I_1$ may be a fixed image or may be animated (i.e. a video).

The more objects $O_1$ (or the rarer the object $O_1$) the image $I_1$ represents, the more differentiating it will be and therefore the more reliable any later authentication or identification. As an illustrative example, if the object $O_1$ corresponds to a photograph of a rare object, the captured image $I_1$ of this object will be more differentiating.

In any event, the object or objects $O_1$ represented in the image $I_1$ can be any objects, meaning that the person 1 chooses them freely without being forced to select from a predefined set or from an existing medium. As an example, unlike the prior art discussed in the introduction, the person 1 does not have to choose an object from predefined themes or categories. He also does not have to select an image from among a finite set of images representing predetermined objects. Quite the reverse: the person 1 generates his own image $I_1$ which is entirely his own idea. Consequently, the space of possible images is more or less infinite, and in any event is much, much larger than that of said prior art.

In addition, due to this huge capacity for customization during the capture of the image $I_1$, the effort required for the person to remember the object $O_1$ later on can be considerably reduced, particularly compared to the task of recognizing one or more images from among several dozen or several hundred predetermined and possibly similar images.

Another advantage of this approach lies in the fact that only the person 1 knows what object $O_1$ is in the captured image $I_1$, because the choice of object is made secretly by the person 1 (without informing anyone). In particular, the server 3 does not know the nature of the object $O_1$ and no classification of the image $I_1$ is made based on the type of object $O_1$ that it represents. The person 1 therefore possesses a secret, which complicates the task of an attacker wanting to retrieve data concerning the person 1 from the server 3. As an illustration, the computing power needed by an attacker to compare two images without knowing the type of content beforehand far exceeds the relatively small amount required to compare strings of a dozen alphanumeric characters.

The image $I_1$ captured in this manner is then sent to the server 3 using the data transmission unit of the electronic device 2 (step 5). This transmission may be direct or may pass through one or more intermediate devices, for example as in the case where the transmission occurs over a communication network.

The format in which the image $I_1$ is sent may be of any kind. It may, for example, be the format issuing directly from the image capture (e.g. JPEG, BMP, MPEG, or other format). As a variant, another format can be used for the transmission, for example the result of image compression.

Advantageously, the transmission 5 of the image $I_1$ to the server 3 is done in a secure manner. Any procedure appropriate for protecting a transmission can be considered for this purpose, for example such as the use of HTTPS, SSL/TLS, or some other protocol. This prevents a passive attacker monitoring the transmission channel between the electronic device 2 and the server 3 from having clear access to the image $I_1$.

Upon receipt of the image $I_1$, the server 3 advantageously keeps it in local storage or remote storage to which it has access, where it can be found in case of a future authentication or identification.

Advantageously, one or more personal data items of the person 1 can be sent to the server 3 as a supplement to the image $I_1$. These data may be, for example, sent using the data transmission unit of the electronic device 2 or by any other appropriate means. These personal data may include any data that can be used in the context of an authentication or identification. For example, they may include at least one from among: a password, an electronic address of the electronic device 2, an identity, or other data.

In this case, the various data items concerning the person 1 are advantageously stored in association by the server 3. This is what is illustrated in FIG. 1, where the image $I_1$ is stored next to a password $m_1$ for the person 1 (denoted ($I_1$, $m_1$)).

One advantage of the registration mode just described lies in how easy it is for the person 1 to revoke it. This revocation can consist of simply deleting the image $I_1$ from the server 3, for example after a request to this effect from the electronic device 2 or other. For such a revocation, it is also possible to replace of the image $I_1$ with another image related to the person 1.

One will note also that this use of an image $I_1$ guarantees the privacy of the person 1, because the image provides little information about said person. In particular, it will generally be difficult or even impossible to discover the identity of the person 1 from the image $I_1$ alone.

Yet another advantage is that the registration procedure just described only requires a simple structure and limited hardware. As mentioned above, the person 1 can register himself using a simple mobile phone equipped with photographic capabilities for example. The use of specialized hardware (smart card, specific digital processing module, etc.) is not necessary, although it is not excluded. This ability of a person 1 to register, at low cost and effort, can be described as self-registration.

Figure 2:
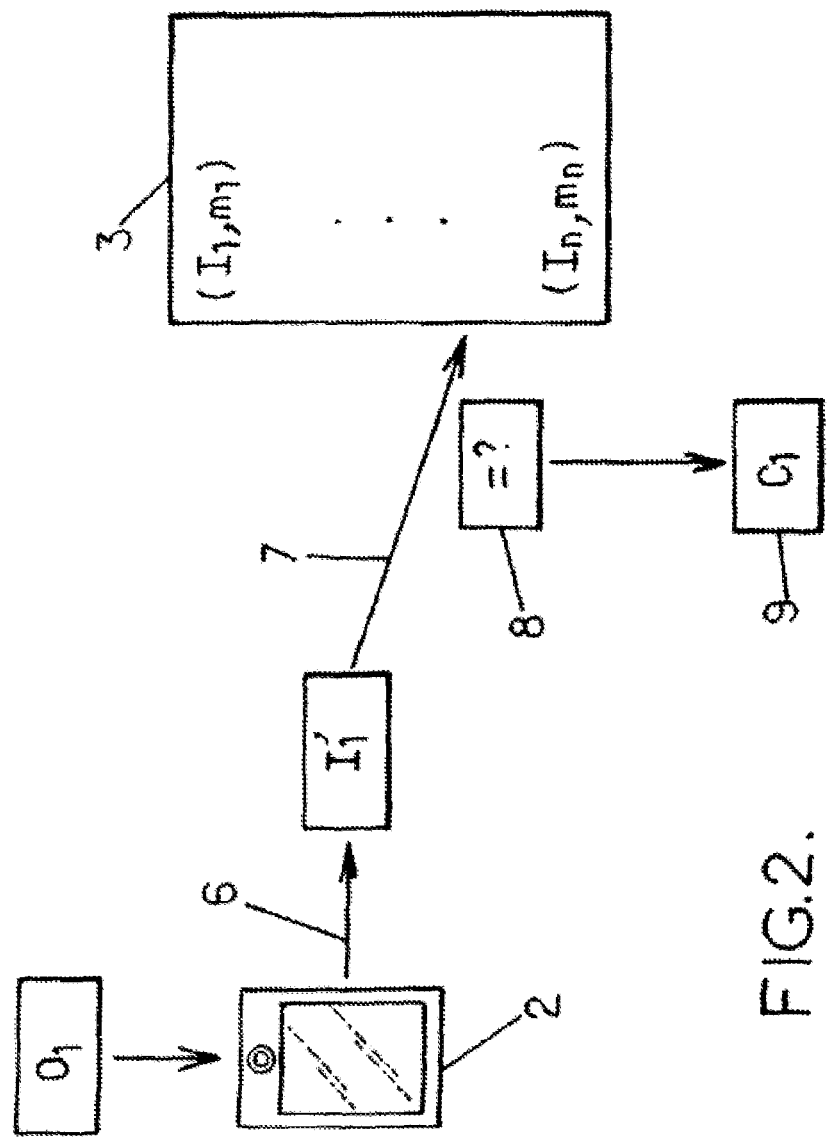
FIG. 2 is a diagram showing an example of an authentication or identification phase which can be used in an embodiment of the invention.

Another aspect of the invention is described with reference to FIG. 2. This concerns the phase of authenticating or identifying a person. The following example involves the same person 1 who was previously registered with the server 3 as described above.

This phase makes use of an electronic device which may be the same one used for the registration or may be another electronic device. In the non-limiting example illustrated in FIG. 2, the same electronic device 2 is used.

An image $I'_1$ is obtained by the electronic device 2 (step 6), for transmission to the server 3 (step 7). This image $I'_1$ represents one or more objects identical or similar to that or those of the image $I_1$ captured during the prior registration. In the present example, the image $I'_1$ represents the same object $O_1$ as the one in the image $I_1$. As a variant, this image could represent an object $O'_1$ similar to the object $O_1$ of the variant image $I_1$. As an illustration, if the object $O_1$ consists of a given scene, for example a sunset, the object $O'_1$ could consist of a comparable although not identical scene, for example a sunset photographed at another location and/or on another day.

There are diverse ways in which the image $I'_1$ can be obtained by the electronic device 2. If the image $I_1$ was stored by the electronic device 2 during the registration phase, the same image can be retrieved and resent by the electronic device 2 for the authentication or identification. In this case, the image $I'_1$ is completely identical to the image $I_1$.

Additionally or alternatively, the image $I'_1$ may be freshly captured using the image-capturing unit of the electronic device 2 (or of any other electronic device used in this phase) for the purposes of the authentication or identification of the person 1 with the server 3. "Freshly captured image" is understood to mean an image which was not previously saved and then sent to the verification system, i.e. an image captured for use in the comparison at the time of the authentication or identification. In such case, the person 1 could advantageously endeavor to capture a "fresh" image $I'_1$ of the object $O_1$ that is as close as possible to the reference image $I_1$ in order to facilitate the comparison of the two images by the server 3. However, although the images $I_1$ and $I'_1$ represent the same object $O_1$ in this example, they will not be completely identical. Certain capture parameters may vary between the two images, such as the framing, object position, point of view, scale, noise level, lighting, and/or other parameters. Such variations are taken into account by the image processing algorithm.

The transmission 7 of the image $I'_1$ from the electronic device 2 to the server 3 may occur, for example, under the same conditions as for the image $I_1$, particularly in terms of format, transmission protocol, security (this transmission 7 of the image $I'_1$ possibly being protected) and/or other conditions.

After having received the image $I'_1$, the server 3 compares it to at least the image $I_1$ and possibly to other images received during prior registrations of various persons (step 8). As an example, if the person 1 is undergoing an authentication procedure, the server 3 is able to retrieve the image $I_1$ received for the person 1 during his registration, for example using an identity provided by said person 1. A comparison can then be made solely between the two images $I_1$ and $I'_1$, in order to decide whether or not the person 1 corresponds to the registered person he is claiming to be. In another example, if the person 1 is undergoing an identification procedure, the server 3 can compare the image $I'_1$ to all or part of the images $I_1, I_2, \ldots, I_n$ received during prior registrations of various persons, particularly the image $I_1$ related to the person 1, in order to decide whether or not the person 1 corresponds to a registered person.

The comparison between two images as mentioned above, for example between the images $I_1$ and $I'_1$, consists of verifying whether the two images represent the same objects, for example $I_1$.

To do this, any known algorithm appropriate for image comparison can be used.

As a non-limiting example, an algorithm can be used which searches each image for local descriptors, such as feature points, texture information, color information, and/or other information, then searches for similarities between the local descriptors for the two images to be compared (graph matching).

When using feature points of the images as local descriptors, for example according to the SIFT, SURF, or Harris point techniques, one can advantageously look for ones that are invariant or are at least relatively insensitive to a certain number of image transformations such as translations, rotations, other geometric transformations, differences in lighting, changes in scale, changes in point of view, noise level variations, and/or others. The comparison between the feature points of two images can be relatively basic or much more sophisticated, for example using Hough transforms, nearest-neighbor searches, and/or others.

Non-limiting examples of such an algorithm can be found in the following articles: "Distinctive Image Features from Scale-Invariant Keypoints" by D. Lowe, dated Jan. 5, 2004 (for publication in the "International Journal of Computer Vision" in 2004) and "Scale & Affine Invariant Interest Point Detectors" by K. Mikolajczyk and C. Schmid, International Journal of Computer Vision 60(1), 63-86, 2004.

Additionally or alternatively, the image comparison algorithm used may be based on edge detection of the object represented by each image, then a comparison of detected edges based on their shape (shape matching).

A non-limiting example of such an algorithm can be found in the following article: "Shape Matching and Recognition—Using Generative Models and Informative Features" by Z. Tu and A. Yuill, 2004.

Any other appropriate algorithm for comparing images can be used for the authentication or identification. The site http://www.google.com/mobile/goggles/#book, for example, gives an interesting example of known means for applying object recognition to photos taken on a telephone.

In addition, multiple algorithms can be used together or combined to improve the reliability of the comparison.

A decision $C_1$ concerning the authentication or identification of the person 1 can then be made by the server 3 by taking into account the result of the image comparison (step 9).

In the context of an authentication procedure, if the comparison 8 of the images $I_1$ and $I'_1$ reveals a match between their respective objects, it can for example be concluded that the person 1 is the registered person he claims to be. In the context of an identification procedure, if the comparison 8 of the images $I_1$ and $I'_1$ reveals a match between their respective objects, it can for example be concluded that the person 1 does indeed correspond to a registered person.

If, as described above, the server 3 has received from the electronic device 2 a personal data item for the person 1, for example a password $m_1$, to supplement the image $I_1$ during the registration phase for the person 1, it can advantageously receive a corresponding personal data item during the authentication or identification phase, for example a password $m'_1$, to supplement the image $I'_1$. In this case, the conclusion $C_1$ reached by the server 3 concerning the authentication or identification of the person 1 can result not only from the comparison of the two images $I_1$ and but also from the comparison of the two personal data items, for example two passwords $m_1$ and $m'_1$.

There can be diverse ways of connecting the two comparisons. For example, these two comparisons may each be made in an equivalent manner. As a variant, in the context of an identification for example, the server 3 may begin by scanning some or all of the stored personal data $m_1, m_2, \ldots, m_n$ in order to compare them to the personal data item $m'_1$. Once a selection of candidates has been established on the basis of this first comparison of personal data, the server 3 can then compare the image to the images stored by or for the server 3 for the selected candidates only. This reduces the computation required, by limiting the number of image comparisons. Other connections between the two types of comparisons can be considered in addition or as alternatives to those just described, as will be apparent to a person skilled in the art.

One will note that, although the above description has been provided for the case where only one image $I_1$ is captured during the registration phase and is then compared to another image during the authentication or identification phase, the invention also applies to the case where multiple images $I_1$, possibly but not necessarily related, would be captured during the registration phase then compared to corresponding images during the authentication or identification phase. This provides increased differentiation and consequently increases the reliability of the authentication or identification.

As described above, the verification system 3 used does not have to be only one server. As an example, it could consist of several entities carrying out respective functions.

A non-limiting example of such a distributed verification system could be arranged as follows: a first entity of the verification system could receive the images $I_1$ and possibly perform the comparison, while a second entity of the verification system would handle at least a portion of the actual verification, possibly in cooperation with the first entity. In such a scenario, the first entity could for example comprise a smart card and/or a terminal, possibly co-located with (or embedded in) at least one of the electronic devices used by the person 1 concerned, or in proximity to it, while the second entity could, for example, consist of a simple server, for example without an image processing module.

In this scenario, if a match is determined between the objects of the images $I_1$ and the first entity could, for example, generate a key from the image $I_1$ and/or the image then this key could be used in a secure dialog between the first entity and the second entity for verification purposes, meaning for authenticating and/or identifying the person 1 concerned. The key in question could, for example, comprise a numerical value corresponding to the image $I_1$ and/or the image $I'_1$, possibly after application of a cryptographic function, such as a hash function for example. The verification could then, for example, consist of a secure transmission of the key from the first entity to the second entity, then a comparison by the second entity of the received key to a previously obtained key for the person 1.

Of course, other mechanisms and other architectures for the verification system are also conceivable, as will be apparent to a person skilled in the art.

Some or all of the operations just described can be carried out by one or more computer programs comprising appropriate code instructions. As an example, a computer program can be loaded and executed on each electronic device and/or on the verification system in order to carry out the operations for which these different entities are respectively responsible.

The invention claimed is:

1. A method enabling the authentication or identification of a person, using a first electronic device comprising an image-capturing unit and a data transmission unit, said method including a phase of registering said person with a verification system, said registration phase comprising the following steps:
   capturing, using an image-capturing unit of said first electronic device, a first image of at least one object of any kind that is secretly selected by the person among any object or part of an object to be photographed and that the person always has on his or her person, said object being not determined in advance;
   transmitting said first image to the verification system in a secure manner by means of the data transmission unit of said first electronic device;
   further including an authentication or identification phase relative to said person, using a second electronic device, the authentication or identification phase comprising the following steps carried out in the verification system:
   receiving from the second electronic device a second image of at least one object that is identical or similar to the object in the first image;
   comparing the second image to at least the first image; and
   deciding that the person is authenticated or identified successfully when the comparison of the second image to the first image reveals a match between their respective objects;
   wherein the second image has been freshly captured using an image-capturing unit of said second electronic device, for the purposes of the authentication or identification of the person in said verification system and is not identical the first image.

2. The method according to claim 1, wherein at least a first personal data item for said person is sent to the verification system as a supplement to the first image.

3. The method according to claim 1, wherein the first electronic device and the second electronic device are the same device.

4. The method according to claim 1, wherein the first electronic device and/or the second electronic device belong to said person.

5. The method according to claim 1, wherein the second image is sent in a secure manner from the second electronic device to the verification system.

6. The method according to claim 1, further including:
   wherein at least a first personal data item for said person is sent to the verification system as a supplement to the first image;
   and further comprising the steps of:
   receiving, from the second electronic device, a second personal data item for said person corresponding to the first personal data item, and
   comparing the second personal data item to at least the first personal data item, and
   deciding that the person is authenticated or identified successfully when the comparison of the second image to the first image reveals a match between their respective objects and the comparison of the second personal data item to the first personal data item reveals a match between the second personal data item and the first personal data item.

7. A verification system enabling the authentication or identification of a person, said verification system comprising:
   a first receiving unit for receiving in a secure manner, from a first electronic device, a first captured image of at least one object of any kind that is secretly selected by the person among any object or part of an object to be photographed and that the person always has on his or her person, said object being not determined in advance;
   a second receiving unit for receiving in a secure manner, from a second electronic device, a second image of at least one object that is identical or similar to the object of the first image;
   an image comparison unit that compares the second image to at least the first image;
   a decision unit which decides that the person is authenticated or identified successfully when the comparison of the second image to the first image performed by the image comparison unit reveals a match between their respective objects;

wherein the second image has been freshly captured using an image-capturing unit of said second electronic device, for the purposes of the authentication or identification of the person in said verification system and is not identical to the first image.

8. The verification system according to claim 7, said verification system being distributed across multiple entities.

9. A non-transitory computer readable storage medium, with a program stored thereon, said computer program comprising code instructions for implementing the method according to claim 5 when it is loaded onto and executed by computer means.

* * * * *